INVENTOR
HARRY M. VALENTINE
BY Scrivener & Parker
ATTORNEYS

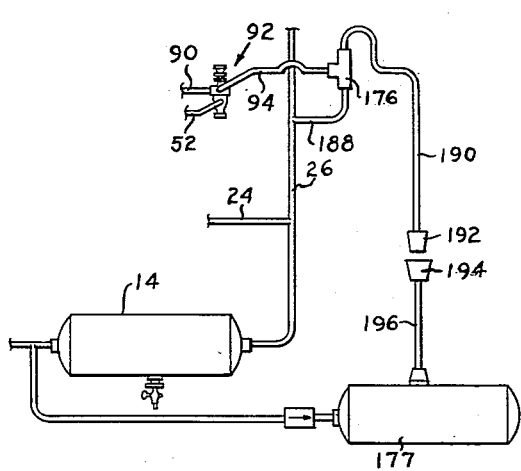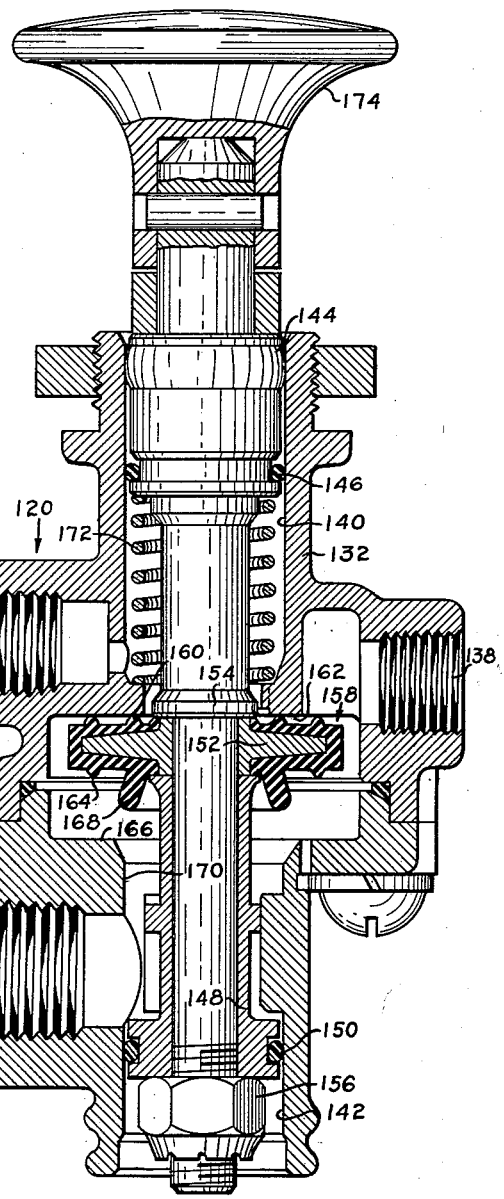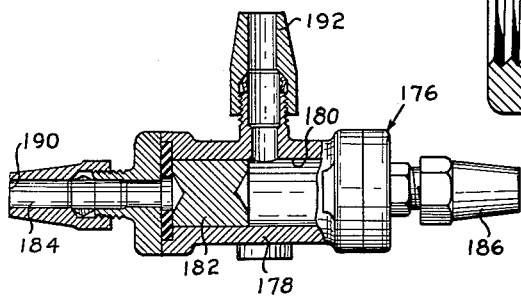

United States Patent Office 3,107,126
Patented Oct. 15, 1963

3,107,126
SPRING BRAKE EMERGENCY RELEASE SYSTEM
Harry M. Valentine, Elyria, Ohio, assignor to Bendix-Westinghouse Automotive Air Brake Company, Elyria, Ohio, a corporation of Delaware
Filed June 28, 1961, Ser. No. 120,231
1 Claim. (Cl. 303—13)

This invention relates to compressed air operated brake systems for vehicles and more particularly to systems including one or more spring actuators for applying the brakes through the action of a spring under certain conditions.

In the prior co-pending application of Harry M. Valentine, et al., Serial No. 42,811, filed July 14, 1960, now patent No. 3,087,760, and assigned to the same assignee as the present application, there is shown and described a brake system which includes spring actuators and means for controlling the application of the brakes by said actuators, either automatically in response to the fall of system pressure to a predetermined low value, or in response to the operation of manual control means. In the system of the prior application, whenever the spring actuators have set the brake in response to the fall of system pressure below a predetermined value, no auxiliary means are available for releasing the brakes, which may be desirable in an emergency.

The principal object of the present invention, therefore, is to provide means enabling controlled release of spring-applied brakes at the will of an operator.

More particularly, it is an object of the invention to provide means for releasing spring-applied brakes after such brakes have become set as a result of a fall of system pressure below a predetermined value.

More specifically, it is an object of the invention to provide means for selectively connecting the spring actuators to an isolated source of auxiliary pressure for moving the brakes to release position whenever such action is necessary or desirable after the brakes have become applied as a result of the fall of brake system pressure below a predetermined value.

Still another object of the invention is to provide spring brake actuator release means which accomplishes the foregoing objects without in any way interfering with the normal automatic or manual control of said brake actuators.

Other objects and their attendant advantages will become apparent as the following detailed description is read in conjunction with the accompanying drawings wherein:

FIG. 2 is a partial view of the system of FIG. 1 but showing a modification of the present invention;

FIG. 3 is an axial sectional view of a control valve for use in the system of FIG. 1; and FIG. 4 is an axial sectional view of a double check valve used in the modification of FIG. 2.

Figure 1:
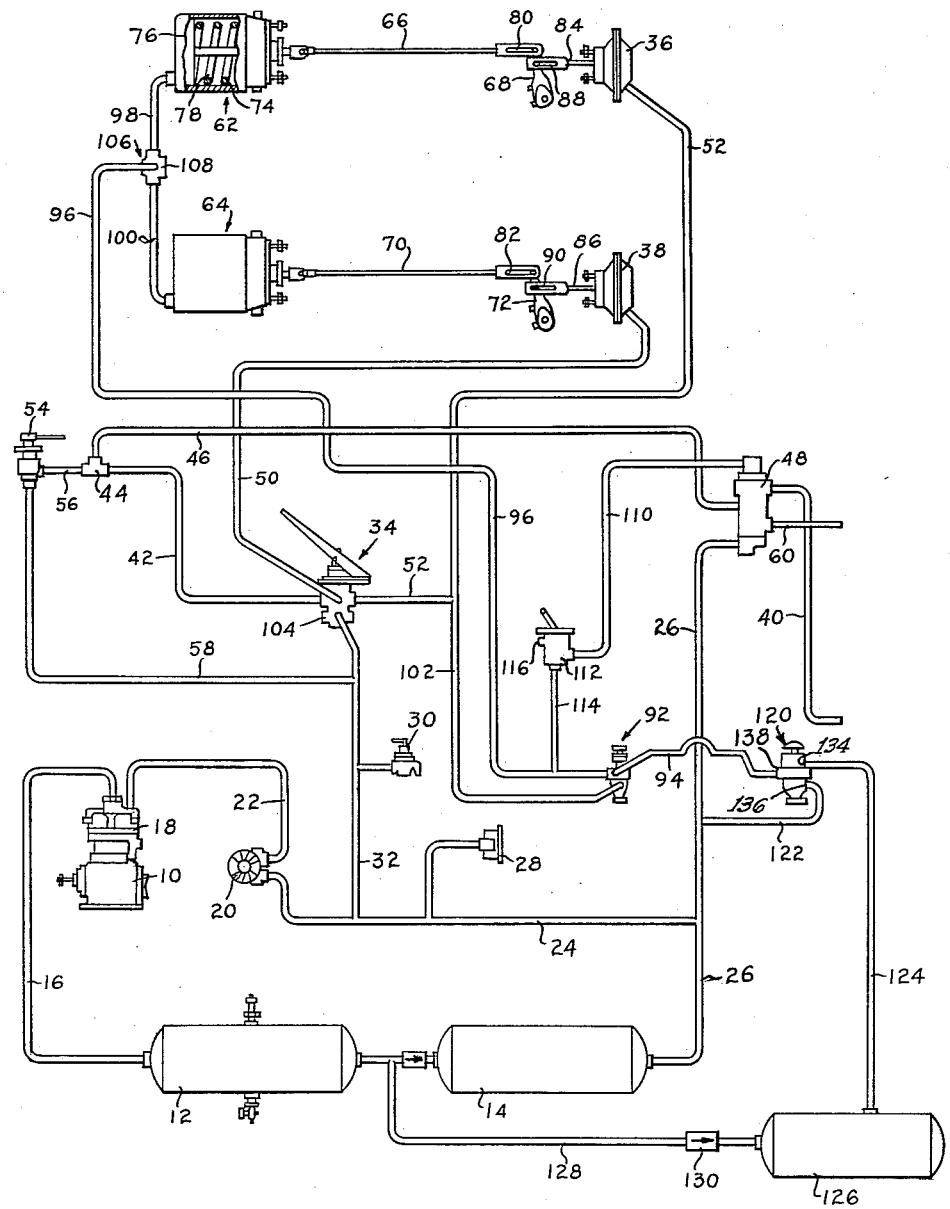
FIG. 1 is a diagrammatic view of a safety brake system embodying the features of the present invention.

The safety brake system of the present invention is illustrated in FIG. 1 in connection with a conventional type of air brake system for use on tractor vehicles. More particularly, the system includes a compressor 10, for supplying compressed air to series-connected reservoirs 12 and 14 through a conduit 16, the compressor having the usual unloader 18 controlled by a conventional governor 20 through conduits 22, 24 connected with an outlet or tractor emergency conduit 26. A suitable pressure gage 28 is connected with the conduit 24 and a conventional low pressure indicator 30 is connected with a conduit 32 inter-connecting conduit 24 with a manually operable self-lapping brake valve 34 which may be of any suitable type. Brake valve 34 may be provided with three outlet conduits for applying the service brake chambers 36 and 38 on the tractor and for charging the trailer service conduit 40 to apply the trailer brakes in service. As shown, outlet conduit 42 and brake valve 34 are connected with conduit 40 through a double check valve 44 of conventional construction, a conduit 46 and a tractor protection valve 48 which may be constructed as shown in the patent to Earl T. Andrews No. 2,850,330 dated September 2, 1958. It will be understood by those skilled in the art that valve 48 is for the purpose of conserving in the tractor brake system a predetermined air pressure in the event of leakage in the trailer brake system or a break-in-two of the connected vehicles. Outlet conduit 50 and brake valve 34 are connected with the brake chamber 38 while outlet conduit 52 is connected with brake chamber 36, it being obvious that due to the connections just described, application of the brake valve 34 will simultaneously charge the conduits 42, 50 and 52 to apply the trailer and tractor brakes in service. If desired, a hand operated brake valve 54 of conventional construction may be connected to the double check valve 44 and the conduit 32 by means of conduits 56 and 58, such valve enabling the operator to charge the conduits 46 and 40 to apply the brakes on the trailer at any time that such valve is moved to a position to connect conduits 56 and 58. Normally the valve 54 occupies a position where communication between conduits 56 and 58 is interrupted. Tractor emergency conduit 26 is connected with trailer emergency conduit 60 through the tractor protection 48.

Safety brake actuators and a control valve therefor are interconnected and associated with the above-described conventional vehicle air brake system. As shown, the system includes a pair of spring actuators 62 and 64 of similar construction, actuator 62 being connected through a piston rod 66 with the brake applying arm or slack adjuster 68 while the actuator 64 is connected through a piston rod 70 with the brake applying arm or slack adjuster 72. Actuators 62 and 64 include a chamber or cylinder 74 in which a piston 76 is slideably mounted, the latter being rigidly connected with the piston rod 66. A spring 78 constantly tends to move the piston 76 toward the left, as viewed in FIG. 1, to apply the brake through the rod 66, and does apply the brake when the air pressure in the brake system drops to a predetermined pressure as for example, 40 p.s.i. As illustrated in FIG. 1, the spring actuators 62 and 64 are illustrated in applied position and it is assumed that no pressure is present in the system. Under these conditions, piston rods 66 and 70 are moved toward the left to apply the brakes through the pin and slot connections 80 and 82. It will be understood that during such brake applying movement of the arms 68 and 72, the movement of brake rods 84 and 86 respectively associated with brake chambers 36 and 38 will occur, due to pin and slot connections 88 and 90. With the above arrangement, it will be understood that whenever the actuators 62 and 64 occupy the position illustrated in FIG. 1, the tractor brakes are applied by spring action.

As explained in the aforementioned co-pending application, valve means are employed for controlling the spring actuators 62 and 64. Such means include a 2-position control valve 92 which in one position is adapted to conduct reservoir pressure from a supply conduit 94 to the spring actuators 62 and 64 to the left of the pistons 76 therein by way of conduits 96, 98 and 100. Under these conditions, as soon as the pressure admitted to actuators 62 and 64 reaches a predetermined pressure, as for example, about 40 p.s.i., pistons 76 will be moved to compress the springs 78 and release the brakes.

In the other position of the control valve 92, the supply conduit 94 is shut off and the conduit 96 is connected to a conduit 102 which is connected with the brake valve outlet conduit 52. Assuming that brake valve 34 is in released position, all outlet conduits 42, 50 and 52 are connected with the atmosphere through the usual exhaust connection 104. Hence, under these conditions, conduits 96, 98 and 100 will also be exhausted to atmosphere to permit application of the brakes by means of the spring actuators 62 and 64. While conduits 98 and 100 may be directly connected with the conduit 96 if desired, it is preferable that they be connected through a quick release valve 106 of well-known construction such as for example, as shown in the patent of Earl T. Andrews No. 2,718,897 dated September 27, 1955. Such valves include an exhaust connection 108 which automatically vents the conduits 98 and 100 whenever the pressure in conduit 96 drops to a value slightly lower than that in the conduits 98 and 100. This avoids the necessity of venting the spring actuators 62 and 64 through the brake valve exhaust 104 which would delay the spring brake application.

Valve 92 may be manually moved to the two positions referred to above. Such valve is also constructed as to be automatically movable from one to the other position to automatically permit spring brake actuation whenever the system pressure in supply conduit 94 drops to a predetermined pressure of approximately 40 p.s.i. Thus the system as so far described provides an effective safety brake means for automatically and mechanically applying the tractor brakes whenever the system pressure drops below a value where it would be unsafe to operate the vehicle and to rely on air braking alone.

The system of FIG. 1 also includes a control line 110 for the tractor protection valve 48 which is connected with the conduit 96 through a trailer two-way control valve 112 and conduit 114. Such valve is of conventional construction and arranged so that in normal position, compressed air may flow from the conduit 96 to the control chamber of valve 48. When the valve is normally moved to emergency position however, such flow is interrupted and the control line 110 is vented to atmosphere via an exhaust port 116 in the valve 112 in order to allow the tractor emergency line 60 to be vented to atmosphere through the valve 48 and thus permit a compressed air emergency brake application on the trailer. Such an emergency trailer application would also occur with the valve 112 in the normal position should the conduit 96 be vented to atmosphere via control valve 92, conduits 102 and 52 and the exhaust 104 of the brake valve 34 as heretofore described. Under such conditions, the tractor brakes would also be automatically applied by the spring brake actuators 62 and 64 as above set forth.

As so far described, the safety brake system is substantially identical to the system of the co-pending application. In the co-pending application, however, the supply conduit 94 leading to the control valve 92, is directly connected to the outlet or emergency conduit 26 so that whenever main reservoir pressure falls below the predetermined value of 40 p.s.i. no means are available for moving the spring actuators to release position because a pressure greater than 40 p.s.i. is required for accomplishing this. Thus no matter how the valve 92 may be manually manipulated in the prior system the spring actuators remain in applied position and even in an emergency they cannot be released. This difficulty is overcome in the present invention by connecting the supply conduit 94, not directly to the emergency conduit 26, as in the prior application, but rather to a second control valve 120 which is movable between two positions either to connect the supply conduit 94 to the emergency conduit 26 by way of a branch conduit 122 or to an auxiliary conduit 124 connected to an auxiliary pressure reservoir 126 which is supplied with pressure through a conduit 128 and check valve 130 from the main reservoir 12.

Except for the connections of conduits thereto, the valve 120 may be in all respects identical to the valve 92 which is described in detail in the co-pending application and to which reference is hereby made. The valve 120 is illustrated in FIG. 3 and comprises a casing 132 having a pair of vertically spaced ports 134 and 136 which are respectively connected to the auxiliary conduit 124 and the branch conduit 122 leading to the emergency conduit 26. The valve 120 is provided with an outlet port 138 which is connected to the supply conduit 94 leading to the control valve 92. Casing 132 is also provided with axially aligned upper and lower bores 140 and 142 for slideably receiving a valve plunger 144, the latter having an upper portion provided with an O-ring seal 146 received in the upper bore 140 and having also a sleeve 148 fixed to its lower portion and provided with an O-ring seal 150 received in the lower bore 142. A valve supporting member 152 is positioned between the upper end of the sleeve 148 and abuts an annular shoulder 154 on the plunger 144, the parts 152 and 148 being maintained in the position illustrated by means of nut 156 threadedly received by the lower end portion of the plunger 144.

As shown, a valve member 158 of rubbery material is carried by the supporting member 152 and is provided with an upper annular bead 160 which is adapted to contact a seat 162 to form an inlet valve for controlling a connection between port 134 connected to the auxiliary reservoir 126 and the outlet port 138 connected to the supply conduit 94 leading to the control valve 92. The lower side of the valve member 158 is formed to provide a second inlet valve and includes an annular bead 164 for contacting a seat 166 and also includes an inner annular bead or lip 168 which is adapted to sealingly engage a bore 170. With the parts shown in the position of FIG. 3, which is the normal position of the valve member, the inlet valve 160 is closed in order to interrupt communication between the auxiliary reservoir inlet port 134 and the outlet port 138 while connecting the latter to the main inlet port 136 so that main reservoir pressure is delivered to the supply conduit 94 and control valve 92. Where this pressure is above the predetermined value of 40 p.s.i., the spring actuators may be moved between applied and released position merely by the actuation of the valve 92 and so long as valve 120 is in its normal position of FIG. 3 the brake system operates exactly as if the valve 120 were not in the system.

As described in detail in the above mentioned copending application, whenever main reservoir pressure falls below the predetermined value the valve 92 moves automatically to a position which connects the spring actuators to atmosphere so that the brakes become set and at the same time the valve 92 disconnects the supply conduit 94 from the conduit 96 leading to the actuators. When the pressure was previously above the predetermined value and the valve 92 had been manually moved to a position connecting the supply conduit with the actuators, pressure above the predetermined value acts on the valve to retain it in the position to which it was manually moved. The retention of the valve in this last mentioned position is afforded by an enlarged area which becomes exposed to the pressure in the supply conduit 94 after the valve element, which is identical to the element 158 in FIG. 3, has been moved downwardly against the pressure of a spring 172 in FIG. 3, by manual force on the valve handle corresponding to the handle 174 in FIG. 3. The effective area of the valve member and the spring loading are correlated so that when the system pressure falls below the predetermined value the spring automatically moves the valve 92 to the position corresponding to the position of valve 120 as shown in FIG. 3. For a more detailed description of the structure and mode of operation of valve 92, reference is made to the co-pending application.

Valve 120, being substantially identical to valve 92, operates in substantially the same manner as valve 92 except that normally valve 120 is in the position of FIG. 3 and as previously mentioned, performs no function unless it is desired to release the spring actuators after system pressure has fallen below the predetermined value. Under these circumstances, the valve 92 will have automatically shifted to the position disconnecting the supply conduit 94 from the spring actuators, as mentioned above. Now, if it is desired to release the spring actuators, the operator pushes the handle 174 of valve 120 inwardly thereby connecting the pressure in the auxiliary reservoir to the supply conduit 94 by way of ports 134 and 138 and at the same time the port 136 which is connected to the main reservoir is disconnected from port 138. Since it is presumed that auxiliary reservoir pressure is substantially equal to the highest pressure previously prevailing in the main reservoir, that is to say, a pressure substantially above the predetermined pressure, valve member 120 once moved to its position connecting ports 134 and 138, will remain in this position due to the force of the auxiliary reservoir pressure acting on the top of the valve element 158. Thus pressure above the predetermined value is available in the supply conduit 94 and the operator may at will admit or exhaust this pressure to and from the spring actuators exactly as if the system pressure in the main reservoir were above the predetermined pressure of 40 p.s.i. Obviously, where the valve 92 is moved to a position connecting supply conduit 94 to the spring actuator conduit 96 valve 92 will be retained in this position by auxiliary reservoir pressure so long as this pressure is above the predetermined value. When the operator wishes to reset the spring actuator he may, if he desires, do so by merely pulling the handle 174 of valve 120 outwardly thereby connecting supply conduit 94 to the emergency conduit 26 which, still presumably being at a pressure below the predetermined value, will enable the retaining pressure in valve 92 to fall below the point where the spring in valve 92 automatically moves the valve handle outwardly so as to disconnect conduits 94 and 96 while simultaneously connecting the latter to atmosphere.

Referring now to the modification of FIG. 2, much of the system shown there is identical to the system of FIG. 1 and receives the same reference numerals except that a double check valve 176 is substituted for the manually controlled release valve 120 of FIG. 1. With this arrangement it will be apparent that whenever the valve 92 is operated to supply pressure to the spring actuators, the pressure which actually flows to the actuators will be derived automatically from one of two alternative sources, that is, either from the main reservoir 14 or from an auxiliary reservoir 177 depending upon which contains the higher pressure. The check valve 176 may be of any well known type as shown, for example, in FIG. 4, where it will be seen that the valve comprises a casing 178 having a bore 180 therethrough which slideably receives a pressure responsive valve element 182 adapted to control connections between aligned inlet ports 184 and 186 respectively connected to conduits 188 and 190, and an outlet port 192 which is connected to the supply conduit 94.

The release conduit 190 need not be permanently connected to the auxiliary reservoir 177 in order to avoid the possibility of the valve element 182 taking a midposition in the bore 180 so as to block all fluid flow to the supply conduit 94, which might be the case if the pressure at the inlet ports 184 and 186 of the valve 176 was balanced, and the normal position of the valve element 182 is that shown in FIG. 4 where the port 186 which is connected to the emergency conduit 26 is in open communication with the outlet port 192 and hence the supply conduit 94. The conduit 190 may be selectively connected to the auxiliary reservoir by means of mating chuck members 192 and 194, the latter of which may be on the end of a flexible conduit 196 which may either be permanently connected to the auxiliary reservoir or it may, if desired, be connectable with one of the vehicle tires which are equally suitable for providing pressure greater than the predetermined pressure when it is desirable in an emergency to release the spring actuators.

The operation of FIG. 2 should be apparent from the foregoing description. During normal operation, the chuck members 192 and 194 are disconnected and the valve element 182 of the check valve 176 is in the position of FIG. 4 so that supply conduit 94 is connected to emergency conduit 26 exactly as if the check valve 176 were not in the system. Where, due to the fall of system pressure below the predetermined value of 40 p.s.i., the brake actuators are automatically connected to atmosphere through the operation of control valve 92 so as to set the brakes, they may thereafter be released in an emergency by connecting the conduit 190 to an auxiliary source of pressure which may be either an auxiliary reservoir as shown in FIGS. 1 and 2 or one of the vehicle tires. Because this auxiliary pressure is at a level above the predetermined value it will act on the check valve element 182 to shift it to the opposite end of bore 180 thereby connecting supply conduit 94 with the conduit 190 so that the control valve 92 may be operated as desired to effect a movement of the spring actuators between their applied and released positions exactly as if system pressure were above the predetermined value.

From the foregoing description, it should be apparent that the system of the present invention affords independent manual and automatic application of spring brake actuators and also provides auxiliary means for releasing the spring actuators in an emergency, for example, whenever system pressure has fallen below the value at which the brakes are automatically applied. It will thus be seen that the invention affords an additional safety feature not readily available in spring brake systems used heretofore. The present invention is particularly valuable because it permits the movement of a vehicle clear of a source of danger which under certain circumstances may be as important as bringing the vehicle to an automatic stop upon the failure of the normal supply of braking pressure. The system shown and described in FIG. 2 has also the desirable feature of permitting the release of the spring brake of a parked vehicle where no pressure exists at all in the braking system by enabling the spring actuators to be connected to one of the vehicle tires which almost invariably contain pressure sufficiently high to permit the release of the brakes.

It will be apparent to those skilled in the art that the systems of the present invention are susceptible of a wide variety of changes and modifications without, however, departing from the scope and spirit of the appended claim.

What is claimed is:

A fluid pressure brake system which includes a main source of fluid pressure, spring brake actuating means, and a manually operable control valve including an inlet port, an outlet port connected to said spring brake actuating means and an atmospheric port, said manually operable valve being movable between alternative positions for connecting said outlet port either to said inlet port or to said atmospheric port while simultaneously disconnecting the former from the other of the latter two so as to control both the application and the release of said spring brakes when the pressure at the inlet port is above a predetermined pressure, said manually operable valve including a spring urging said valve to a position wherein said outlet port is connected to said atmospheric port and disconnected from said inlet port and including a pressure responsive element having a part exposed to the pressure at said inlet port only when said valve is moved to a position connecting said outlet and inlet ports for retaining said valve in the latter position in opposition to said spring so long as the pressure at said inlet port is above said predetermined pressure, an auxiliary source of fluid pressure, a second manually operable valve upstream of said first valve and including a pair of inlet ports respectively connected to said main and auxiliary sources and having an outlet port connected to the inlet port of said first valve, said second valve normally occupying a first position wherein said main source of fluid pressure is connected to the outlet port of said second valve, said second valve including a spring normally urging said valve towards its first position, said second valve including a pressure responsive element having a part which is exposed to the pressure of said auxiliary source only when said valve is moved to a second position connecting said auxiliary source with said outlet port for retaining said valve in the latter position in opposition to said spring so long as the pressure of said auxiliary source is above said predetermined pressure.

References Cited in the file of this patent

UNITED STATES PATENTS

| | | |
|---|---|---|
| 2,645,307 | Stegman | July 14, 1953 |
| 2,976,085 | Grogan | Mar. 21, 1961 |